US010373516B2

(12) United States Patent
Goll et al.

(10) Patent No.: US 10,373,516 B2
(45) Date of Patent: Aug. 6, 2019

(54) METHOD FOR FACILITATING CONTEXTUAL VOCABULARY ACQUISITION THROUGH ASSOCIATION

(71) Applicant: GLOBAL VOCABULARY LLC, Columbia Station, OH (US)

(72) Inventors: Paulette S. Goll, Columbia Station, OH (US); Richard D. Becker, Munroe Falls, OH (US)

(73) Assignee: Global Vocabulary LLC, Columbia Station, OH (US)

( * ) Notice: Subject to any disclaimer, the term of this patent is extended or adjusted under 35 U.S.C. 154(b) by 0 days.

(21) Appl. No.: 15/888,063

(22) Filed: Feb. 4, 2018

(65) Prior Publication Data

US 2018/0158361 A1  Jun. 7, 2018

Related U.S. Application Data

(63) Continuation-in-part of application No. 14/641,142, filed on Mar. 6, 2015.

(60) Provisional application No. 61/949,556, filed on Mar. 7, 2014.

(51) Int. Cl.
| | |
|---|---|
| *G09B 5/06* | (2006.01) |
| *G09B 19/00* | (2006.01) |
| *G09B 7/077* | (2006.01) |
| *G09B 5/12* | (2006.01) |

(52) U.S. Cl.
CPC ............. *G09B 19/00* (2013.01); *G09B 5/06* (2013.01); *G09B 5/065* (2013.01); *G09B 5/12* (2013.01); *G09B 5/125* (2013.01); *G09B 7/077* (2013.01)

(58) Field of Classification Search
CPC .......... G09B 19/06; G09B 5/06; G09B 5/065; G09B 5/12; G09B 5/125; G09B 7/077
USPC ........................................................ 434/169
See application file for complete search history.

(56) References Cited

U.S. PATENT DOCUMENTS

| | | | | |
|---|---|---|---|---|
| 5,302,132 | A * | 4/1994 | Corder | G09B 5/14 345/173 |
| 5,813,862 | A * | 9/1998 | Merzenich | G09B 5/065 434/118 |
| 2007/0231776 | A1 | 10/2007 | Saldutti | |
| 2012/0329013 | A1* | 12/2012 | Chibos | G09B 5/06 434/157 |

* cited by examiner

*Primary Examiner* — Robert P Bullington
(74) *Attorney, Agent, or Firm* — Rankin, Hill & Clark LLP

(57) ABSTRACT

Vocabulary acquisition of lists of words drawn from standardized tests are facilitated through contiguity of audio, visual and kinesthetic stimuli. The positive association of each word and a meaning of the word is achieved by separately displaying each word and stimuli on a graphical user interface of an electronic device which simultaneously or immediately successively plays the audio segment and prompts the user to physically interact with the electronic device. Through an ordered combination of steps, the method facilitates rapid verifiable contextual vocabulary acquisition via two levels of assessment testing, one in which the knowledge of the user is potentially aided by the correlation between the audio and visual segments and kinesthetic features, and one which is not.

14 Claims, 9 Drawing Sheets

Practice ⌒³⁰²
Fill in the blanks with the correct word to match the definition. You have been given o's to help you.
Word list: DOLOROUS, OMINOUS, ⌒³⁰⁴
SOMNOLENT
1. O _ _ O _ _ _  threatening
2. _ O _ _ O _ O _ _  mournful
3. _ O _ _ O _  sleepy

FIG. 3A

Rehearsal ⌒³⁰⁶
Fill in the blanks with the correct vocabulary word.
dolorous/ominous/somnolent ⌒³¹⁰
1. The preacher's dark black eyes are _____ as he peers into the souls assembled before him; the threat of damnation looms, but he is there to offer them hope and salvation.

FIG. 3B

Master Class —324 —326

1. The word incredibly means all of the following EXCEPT
   A. phenomenal
   B. extraordinary
   C. amazing
   D. sporadic 2. The word intrepid means all of the following EXCEPT
   A. courageous
   B. fearful
   C. bold
   D. brave 3. The word phenomenal is closest in meaning to
   A. extraordinary
   B. derisive
   C. susurrus
   D. primeval 4. The word explicit is closest in meaning to
   A. obvious
   B. oblivious
   C. obsolete
   D. ominous 5. The word archetype means all of the following EXCEPT
   A. prime example
   B. model
   C. prototype
   D. sovereign

FIG. 3D

METHOD FOR FACILITATING CONTEXTUAL VOCABULARY ACQUISITION THROUGH ASSOCIATION

CROSS-REFERENCE TO RELATED APPLICATIONS

This application is a continuation-in-part of U.S. application Ser. No. 14/641,142, filed Mar. 6, 2015, and claims priority to U.S. Provisional App. Ser. No. 61/949,556, filed Mar. 7, 2014.

BACKGROUND OF INVENTION

Field of Invention

The present invention relates to methods and systems for providing multi-sensory and contextual vocabulary acquisition through the use of one or more contextual vocabulary features. More particularly, the present invention relates to methods and systems for teaching an individual to learn and retain vocabulary words, particularly vocabulary words found in college and graduate school academic disciplines and postsecondary standardized tests.

Brief Description of Related Art

Vocabulary acquisition is an integral component of language development and a staple of standardized testing. Typically three to five multiple-choice vocabulary word questions are tested on each reading passage in a standardized test, and context determines meaning and the correct response for each word.

Several well-known techniques continue to be utilized by students to learn vocabulary. These techniques include looking up "new" words in a dictionary, keeping a word log, studying word lists, creating flash cards, using vocabulary workbooks, logging onto word-of-the-day subscriptions, and constructing graphic organizers, etc. For the most part, these strategies offer repetition based learning techniques with limited or no additionally qualities that can enhance students' abilities to more efficiently learn and contextualize numerous vocabulary words. For example, vocabulary words are generally presented with black letters on a white background. The basic sensory qualities tend to provide a less efficient, less cognitive, lackluster approach to vocabulary acquisition.

BRIEF SUMMARY OF THE INVENTION

According to one aspect, a method for providing a contiguity-based contextual vocabulary acquisition is disclosed. Specifically, in accordance with this aspect, the method includes presenting one or more interfaces that can be utilized to provide a plurality of learning tools that are part of a vocabulary learning toolset and a plurality of assessment tools that are part of a vocabulary assessment toolset. The method also includes determining whether to selectively present one or more contextual vocabulary features on one or more of the learning tools. Additionally, the method includes determining whether to selectively present one or more contextual vocabulary features on one or more of the assessment tools. The one or more contextual vocabulary features provide visual, auditory and kinesthetic schemata that are associated with one or more vocabulary words being presented on the one or more learning tools and one or more assessment tools. The process of contiguity consists of the simultaneous visual presentation of a word and a sound, music, video or animation that is immediately followed by the presentation of a contextual sentence.

According to a further aspect, a system for providing contextual vocabulary acquisition is disclosed. Specifically, in accordance with this aspect, the system includes a contextual vocabulary interface application that is executed on a plurality of electronic devices. The system also includes a vocabulary user interface module that is included as a module of the contextual vocabulary interface application that presents one or more interfaces that can be utilized to provide a plurality of learning tools that are part of a vocabulary learning toolset and a plurality of assessment tools that are part of vocabulary assessment toolset. Additionally, the system includes a vocabulary learning module that is included as a module of the contextual vocabulary interface application that determines whether to selectively present one or more contextual vocabulary features on one or more of the learning tools. The system further includes a vocabulary assessment module that is included as a module of the contextual vocabulary interface application that determines whether to selectively present one or more contextual vocabulary features on one or more of the assessment tools. The one or more contextual vocabulary features provide synchronous or immediately successive visual, auditory and kinesthetic schemata that are associated with one or more vocabulary words being presented on one or more learning tools and one or more assessment tools.

According to still another aspect, a computer readable medium including instructions that when implemented by a processor execute a method for providing contextual vocabulary acquisition is disclosed. Specifically, in accordance with this aspect, the method includes presenting one or more interfaces that can be utilized to provide a plurality of learning tools that are part of a vocabulary learning toolset and a plurality of assessment tools that are part of a vocabulary assessment toolset. The method also includes determining whether to selectively present one or more contextual vocabulary features on one or more of the learning tools. Additionally, the method includes determining whether to selectively present one or more contextual vocabulary features on one or more of the assessment tools. The one or more contextual vocabulary features provide visual, auditory and kinesthetic schemata that are associated with one or more vocabulary words being presented on the one or more learning tools and one or more assessment tools.

BRIEF DESCRIPTION OF THE DRAWINGS

In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 3A is an illustrative example of an exemplary practice assessment tool that is presented to the user to contextually assess a user's knowledge of one or more vocabulary words according to an embodiment;

FIG. 3B is an illustrative example of an exemplary rehearsal assessment tool that is presented to the user to contextually assess the user's knowledge of one or more vocabulary words according to an embodiment;

FIG. 3D is an illustrative example of an exemplary master class assessment tool that is presented to the user to contextually access a user's knowledge of one or more vocabulary words according to an embodiment;

DETAILED DESCRIPTION OF THE INVENTION

Various terms are utilized throughout the specification and the appended claims. Unless otherwise specified expressly or by context, such terms are to be accorded the definitions set forth in the following paragraphs.

A "processor," as used herein, processes signals and performs general computing and arithmetic functions. Signals processed by the processor can include digital signals, data signals, computer instructions, processor instructions, messages, a bit, a bit stream, or other computing that can be received, transmitted and/or detected.

A "bus," as used herein, refers to an interconnected architecture that is operably connected to transfer data between computer components within a singular or multiple systems. The bus can be a memory bus, a memory controller, a peripheral bus, an external bus, a crossbar switch, and/or a local bus, among others.

A "memory," as used herein can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

An "operable connection," as used herein can include a connection by which entities are "operably connected", is one in which signals, physical communications, and/or logical communications can be sent and/or received. An operable connection can include a physical interface, a data interface and/or an electrical interface.

An "input device" as used herein can include devices for controlling different features which include various components, systems, and subsystems. The term "input device" includes, but it not limited to: push buttons, rotary knobs, and the like. The term "input device" additionally includes graphical input controls that take place within a user interface which can be displayed by various types of mechanisms such as software and hardware based controls, interfaces, or plug and play devices.

An "output device" as used herein can include devices that can derive from components, systems, subsystems, and electronic devices. The term "output devices" includes, but is not limited to: display devices, and other devices for outputting information and functions.

Figure 1:
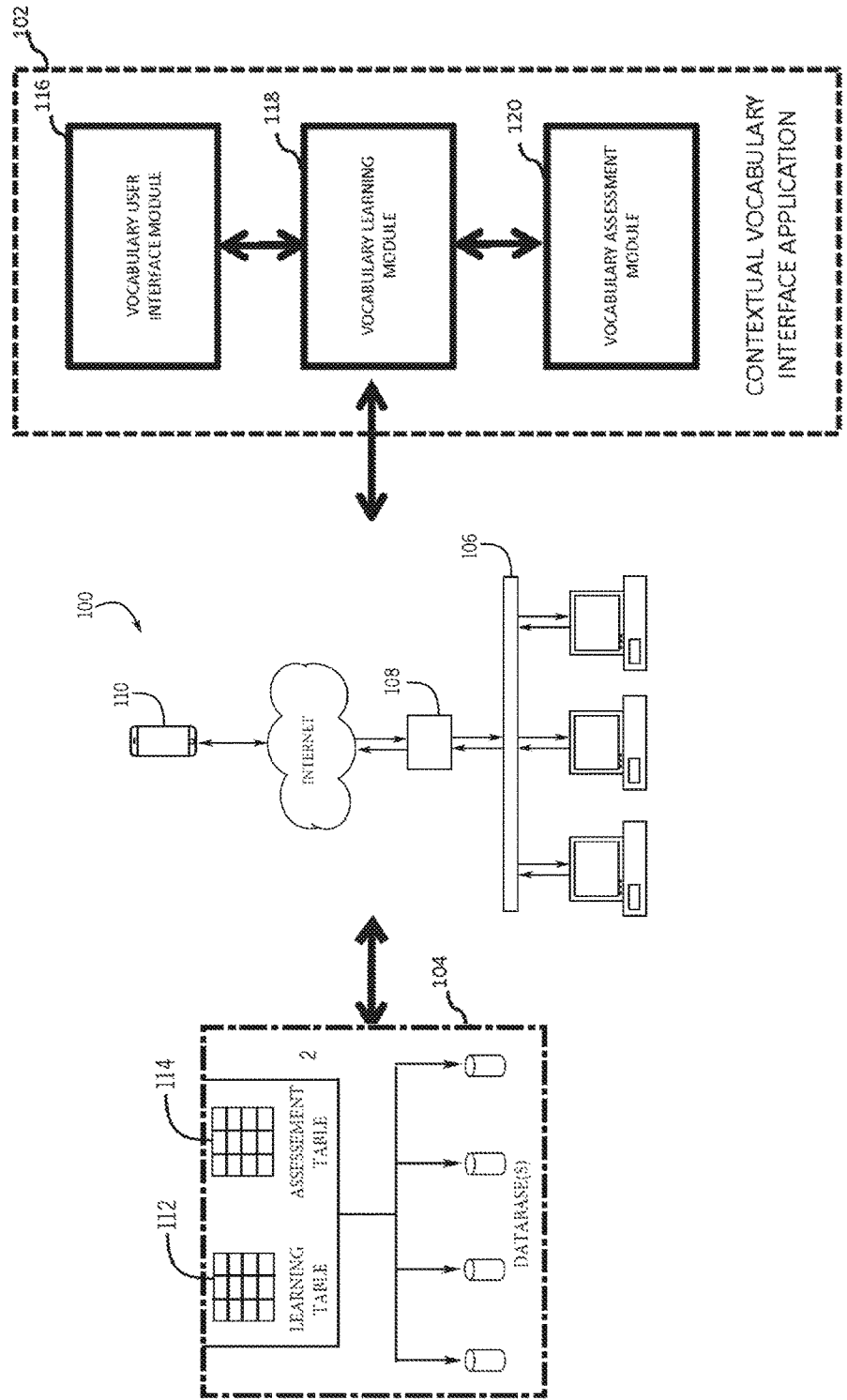
FIG. 1 is a schematic view of an exemplary contextual vocabulary acquisition system for presenting multi-sensory and contextual vocabulary acquisition and methods according to an embodiment.

Referring now to the drawings, wherein the showings are for purposes of illustrating one or more exemplary embodiments and not for purposes of limiting the same. FIG. 1 shows schematic view of an exemplary contextual vocabulary acquisition system for presenting multi-sensory and contextual vocabulary acquisition and methods according to an embodiment. The components of the contextual vocabulary acquisition system 100, as well as the components of other systems, hardware architectures and software architectures discussed herein, can be combined, omitted or organized into different architecture for various embodiments. However, the exemplary embodiments discussed herein focus on the environment 100 as illustrated in FIG. 1, with corresponding system components, and related methods.

As shown in the illustrated embodiment of FIG. 1, the contextual vocabulary acquisition system 100 provides an overview showing the communications and data transfers between a contextual vocabulary interface application 102 and one or more databases 104. In an exemplary embodiment, the contextual vocabulary interface application 102 utilizes data that is pulled from (e.g., by querying) one or more database tables residing on the database(s) 104 to be accessed by the (components of the) contextual vocabulary interface application 102. In an alternate embodiment, the contextual vocabulary interface application 102 can also utilize data that is pushed (i.e., sent) to be retained/stored within the one or more database tables residing on the database(s) 104 to be accessed by the components of the contextual vocabulary interface application 102. In yet an another alternate embodiment, the contextual vocabulary interface application 102 can utilize data that is pulled from one or more database tables residing on third party databases (e.g., search engine databases) in order to be utilized by the components of the contextual vocabulary interface application 102.

Specifically, in an exemplary embodiment, the contextual vocabulary interface application 102 may be utilized by a user (e.g., student) to learn and retain vocabulary words typically found in college and graduate school academic disciplines wherein one or more past standardized tests are selected from a group consisting of postsecondary standardized tests (e.g., ACT®, SAT®, TOEFL®, GRP). The contextual vocabulary interface application 102 provides the user with multi-sensory contextual vocabulary acquisition by providing one or more contextual vocabulary features that provide visual, auditory and kinesthetic schemata that are associated with specific vocabulary words. The contextual vocabulary interface application 102 utilizes the association of prior knowledge of ideas and experiences with expanded vocabulary through an associate process by presenting one or more contextual vocabulary features that include but are not limited to images, audio, video, characteristics, and associated data that pertain to one or more vocabulary words. Scaffolding visual, auditory, and kinesthetic pedagogy in acquiring and retaining vocabulary offers optimal, integrated learning experiences that enhance the user's ability to learn multiple vocabulary words in an efficient and effective manner.

The contextual vocabulary interface application 102 can be executed on one or more stationary computing devices 106 (e.g., a desktop computer) and/or one or more portable electric devices 110 (e.g., a handheld device, a mobile device, a smart phone, a laptop, a tablet, and an e-reader.) In an exemplary embodiment, the contextual vocabulary interface application 102 is a software application that is installed directly onto memory (not shown) of the stationary computing device(s) 106 and/or the portable electronic device(s) 110. In another embodiment, the contextual vocabulary interface application 102 and/or one or more of the components of contextual vocabulary interface application 102 can be installed externally from the memory of the portable electronic device(s) 110 and/or the stationary computing device(s) 106. For example, the contextual vocabulary interface application 102 can include a web based application that is accessed by a communication device (not shown) of the portable electronic device(s) 110 and/or the stationary computing device(s) 106.

As a web based application, the contextual vocabulary interface application 102 can be installed on one or more web servers 108. The one or more web servers 108 can host the contextual vocabulary interface application 102 to be accessed by numerous portable electronic devices 110 and/ or stationary computing devices 106 via a wired or wireless (e.g., GSM, CDMA, GPRS, Wi-Fi, WiMax, 3G, and/or LTE) connection through an internet cloud. In other embodiments, the contextual vocabulary interface application 102 can include a cloud based application that resides on an external host server such as the web server(s) 108 but is accessed through a viewer application that is installed on the memory of the portable electronic device(s) 110 and/or the stationary computing device(s) 106.

The contextual vocabulary interface application 102 includes various modules that are controlled and operated by a processor or control unit of the portable electronic device(s) 110, the stationary computing device(s) 106, and/ or the web server(s) 108. The contextual vocabulary interface application 102 includes a vocabulary user interface module 116, a vocabulary learning module 118, and a vocabulary assessment module 120.

The vocabulary user interface module 116 can present a plurality of interfaces and sub-interfaces that are related to the operation of the contextual vocabulary interface application 102. In an exemplary embodiment, upon initialization (i.e., launch) of the contextual vocabulary interface application 102, the vocabulary user interface module 116 can present the user with an opening tool guide interface that allows users to utilize a vocabulary learning toolset (learning toolset) and/or a vocabulary assessment toolset (assessment toolset). In one embodiment, the opening tool guide interface can include a virtual input device that is presented in the form of a virtual musical instrument (e.g., piano or guitar) that the user can input (by kinesthetically playing, tapping, or clicking on a virtual key/string) in order to selectively utilize the learning toolset or the assessment toolset of the contextual vocabulary interface application 102. As will be described in more detail below, the learning toolset can include one or more types of learning tools that can present one or more vocabulary words to the user along with contextual vocabulary features in order for the user to learn the vocabulary word(s). The assessment toolset can include one or more types of assessment tools (e.g., same exercises and tests) that can be presented to the user in order for the user to assess and continue to reinforce knowledge of learned vocabulary words (gained by the user while using the learning toolset).

In an exemplary embodiment, when the user utilizes the learning toolset of the contextual vocabulary interface application 102, the vocabulary user interface module 116 presents the user with one of a plurality of learning tools that utilize various contextual vocabulary features to assist users to learn vocabulary words. The contextual vocabulary features include, but are not limited to, the presentation of images, sounds, colors, music, fonts, etc. that are presented in order to assist the user in grasping one or more vocabulary words. In some embodiments, the construct of music is utilized to allow the user to interact with virtual musical instruments to virtually play keys and chords that are tied to certain musical tunes, sounds, and images to stimulate the user's curiosity and interest in learning certain vocabulary words.

In some embodiments, the learning tools can include one or more user interface input icons that the user can input in order to initiate the presentation of various contextual vocabulary features on each of the learning tools. In some embodiments, the virtual input device (e.g., virtual musical instrument) is presented to the user on the upper right hand or left hand corner of the learning tools. The virtual input device can be inputted (e.g., playing the keys of the virtual musical instrument) in one or more specific manners to initiate various contextual vocabulary features that can be presented on each of the learning tools. For example, the user can play one octave (input a note) of a virtual musical instrument to view a different learning tool showing a new vocabulary word. Additionally, the user can play a different octave (input a different note) of the virtual musical instrument to view an image associated with the vocabulary word being displayed on the learning tool. Many other non-limiting embodiments of input techniques that can initiate various contextual vocabulary features to be presented on the learning toolset of the multi-sensory vocabulary application 102 will be apparent.

Figure 2A:
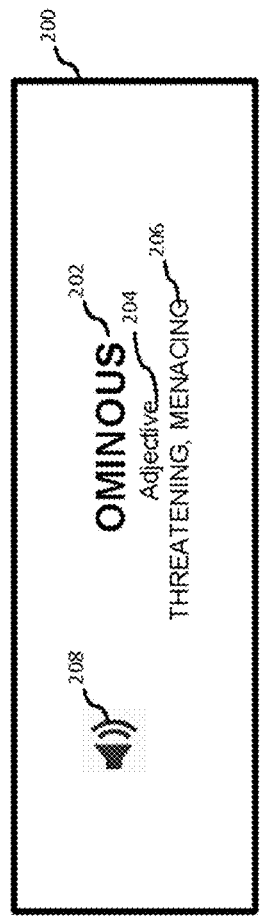
FIG. 2A is an illustrative example of an exemplary learning tool of the learning toolset that is presented to a user to contextually teach a vocabulary word through one or more contextual vocabulary features according to an embodiment.

FIG. 2A is an illustrative example of an exemplary learning tool 200 of the learning toolset that is presented to the user to contextually teach a vocabulary word through one or more contextual vocabulary features. The learning tool 200 can present one or more color-coded vocabulary words 202 (color has been omitted from the drawing figures due to patent rules, but would appear in an actual embodiment of the invention), the part(s) of speech 204 of the vocabulary word(s) 202, a brief definition 206 of the vocabulary word(s) 202, and an icon 208 that can be selected by the user to allow the user to hear a pronunciation of the vocabulary word 202. In some embodiments, the color coded vocabulary word(s) 202 can be presented as italicized, bold-faced, larger, smaller, underlined, or in a distinctive font. The color and style of the vocabulary word(s) 202 can be presented in a style that incites feelings within the user that represent the context of the vocabulary word 202. For example, the vocabulary word "ominous" 202 may be presented in red color in a particular type of font that indicates a threat to reinforce the meaning of the vocabulary word 202. Other representative examples include the following:

FLOURSIH—GROW, thrive
CAPRICIOUS—erratic, impulisve
EQUILIBRIUM—stability, bal a nce In addition, the learning tool can provide the user with kinesthetic contextual features. For example, the user could obliterate the vocabulary word EFFACE using a digital eraser, kinesthetically finger-wag the vocabulary word REPUDIATE, or perform a calisthenics series to simulate the earthquake shake vocabulary word TREMOR.

In another embodiment, the user can access scales of synonyms increasing in levels of difficulty and color intensity using the learning tool to expand vocabulary acquisition. For example, in the key of F Sharp Minor:

EXPLICIT—comprehensible—obvious—intelligible—overt—lucid—limpid—perspicuous

For a color-blind individual, gradients of black would appear:

EXPLICIT—comprehensible—obvious—intelligible—overt—lucid—limpid—perspicuous

Vocabulary can be upgraded based on children's songs, sayings, and idiomatic phrases. In addition, the learning tool can provide the user with the opportunity to use collocations to acquire and master vocabulary words. In an example of an audio collocation, the user would be instructed or encouraged to sing the well-known children's song: "Twinkle, twinkle, little star", but upgrading the vocabulary using the words "Scintillate, scintillate minute asteroid" to the tune of the music of the song Jingle Bells. In addition, the learning tool can present collocations—word combinations that just sound "right" to native English speakers—to link vocabulary words such as, for example: ABORIGINAL tribe; DEPRECATING remark; and MITIGATING circumstances.

In one embodiment, the learning tool 200 can include a plurality of user input icons (not shown) that can be inputted by the user to initialize one or more contextual vocabulary features that are associated to the vocabulary word(s) 202 that are presented to the user. However, in the presently preferred embodiment, the learning tool 200 automatically presents applicable contextual vocabulary features that are associated to the vocabulary word(s) 202 presented to the user.

Some of the contextual vocabulary features that can be presented on the exemplary learning tool 200 will now be discussed. The learning tool 200 can present a brief audio based musical segment that establishes contiguity and reinforces the association between the word and the meaning. For example, the user can be presented with a musical tune/theme from a movie (e.g., alternating pattern of two notes from the movie Jaws) that incites feelings within the user that represent the vocabulary word "ominous" 202 presented in FIG. 2A. Optionally, an image can also be presented that can represent and reinforce the vocabulary word (e.g., an image of a shark). Additionally, video content can also be presented that can reinforce the vocabulary word (e.g., a video clip from the movie Jaws that shows the dorsal fin of the shark approaching a swimmer that is representative of the vocabulary word "ominous" 202). In some embodiments, the learning tool 200 can include an icon (not shown) that can be inputted by the user to view a list of words that are associated to the vocabulary word(s) 202. For example, the user can input the icon to view synonyms of the vocabulary word(s) 202 being presented on the learning tool 200. It should be noted that the use of antonyms is generally to be avoided, as antonyms can disrupt mental imaging. The contiguity between a vocabulary word and stimuli (i.e. sounds) needs to be made in a positive mode while an individual is learning the word. The ability of an individual to delineate a negative patterning in a test question is a different mental process.

Figure 2B:
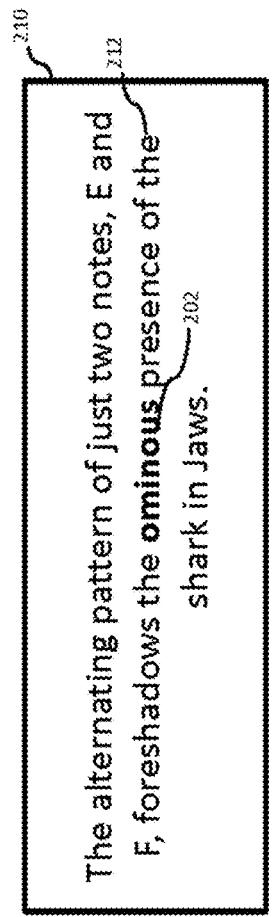
FIG. 2B an illustrative example of an exemplary learning tool of the learning toolset that is presented to the user to contextually teach a vocabulary word through one or more contextual vocabulary features according to an embodiment.

FIG. 2B is an illustrative example of an exemplary learning tool 210 of the learning toolset that is presented to the user to contextually teach a vocabulary word through one or more contextual vocabulary features. In one embodiment, the learning tool 200 (shown in FIG. 2A) can present a user input icon (not shown), which can be used by the user to request to view one or more sentences that include the color-coded vocabulary word(s) 202. More preferably, the learning tool 200 simply displays the one or more sentences automatically, and does not require user input. As shown in the exemplary sentence 212, the sentence(s) 212 can include the color-coded vocabulary word 202 within the context of the sentence(s) 212 that describes the musical tune that continues to be played as the learning tool 210 displays the vocabulary word 202. In other words, as the learning tool 210 is presented, the audio based musical segment is played and described within the sentence. In some embodiments, the learning tool 210 can also include an icon (not shown) (similar to the icon 208 in FIG. 2A) that can be input by the user to hear the audio pronunciation of the vocabulary word 202 within the sentence 212. Again, more preferably this functionality is presented to the user automatically (i.e., does not require user input).

In one or more embodiments, the vocabulary user interface module 116 can present various learning tools that include a wide variety of sentence forms, types, subject matter, and contextual vocabulary features in order to reinforce the vocabulary word(s) 202 presented to the user. For example, some learning tools can include paragraphs and/or reading passages (short stories) that include one or more images, sound clips, movie clips, etc. The sentences, paragraphs, and reading passages found on the learning tools can also include idiomatic phrases that can be presented in a highlighted manner in order to aid the user in learning the vocabulary word(s) 202.

The vocabulary assessment toolset of the contextual vocabulary interface application 112 will now be discussed. In one embodiment, the user can initialize the assessment toolset from the opening tool guide interface and/or one or more learning tools. For example, the user can input the virtual input device presented on the opening tool guide in a specific manner (e.g., virtually play two octaves of the virtual musical instrument) in order for the vocabulary user interface module 116 to present the vocabulary assessment toolset.

In an exemplary embodiment, when user initiates the vocabulary assessment toolset, the vocabulary user interface module 116 presents an opening assessment interface. In one embodiment, the opening assessment interface includes a plurality of icons that are linked to a plurality of assessment tools that the user can input and utilize. When input, the plurality of icons initiates assessment tools that apply various assessment techniques to assist users in assessing their knowledge by utilizing practice questions/tests in order to further retain learned vocabulary words.

In one or more embodiments, the assessment tools can be tailored to one or more subsets of vocabulary words that typically appear on a standardized test. The vocabulary assessment tools can be individually scored with an assessment score based on the user's answers, the type of assessment tool presented, and the level of vocabulary word(s) presented. In one embodiment, the assessment tools can range from being least difficult and including the highest presentation of contextual vocabulary features (e.g., color coded vocabulary words, sounds, images, videos, music, etc.) to the most difficult and utilizing no presentation of contextual vocabulary features (e.g., providing a sample standardized test with no color coded vocabulary words, sounds, images, videos, music, etc.). In this embodiment, the user can select which type of assessment tool he/she would like to utilize based on the input of one the icons that are displayed on the opening assessment interface. However, in other embodiments, as are discussed in more detail below, the contextual vocabulary interface application 102 can require the user to take each of the assessment tools in a pre-determined sequential order. As discussed in more detail below, the contextual vocabulary interface application 102 can require the user to achieve an assessment score that meets a minimum assessment advancement threshold value on each of the assessment tools to access the subsequent vocabulary features.

In an exemplary embodiment, the plurality of assessment tools of the assessment toolset includes, but are not limited to, a practice assessment, a rehearsal assessment, a performance assessment, and a master class assessment. FIG. 3A is an illustrative example of an exemplary practice assessment tool 302 that is presented to the user to contextually assess a user's knowledge of one or more vocabulary words. The practice assessment tool 302 can present the user with one or more practice exercises 306 that include contextual vocabulary features. The meaning of one or more vocabulary words 304 can be reinforced in the practice assessment 302 by presenting different types of practice exercises 306 that can include descriptions (e.g., synonyms) of the one or more vocabulary words 304 to further assist the user to remember/retrieve the vocabulary word from his/her memory. The practice exercises 306 can be presented in various question formats such as fill in the blank questions, short answer questions, etc. In one or more embodiments, contextual vocabulary features included within the practice assessment 302 can include, but are not limited to, the synchronous playing of one or more audio musical segments that are representative of the one or more vocabulary words 304, the presentation of one or more images that are representative of the one or more vocabulary words 304, the presentation of videos that are representative of the one or more vocabulary words 304, the use of one or more colors and styles of font to help assist the user to remember the context of one or more vocabulary words 304, etc.

FIG. 3B is an illustrative example of an exemplary rehearsal assessment tool 308 that is presented to the user to contextually assess the user's knowledge of one or more vocabulary words. The rehearsal assessment tool 308 can present one or more exercises 310 that can also include contextual vocabulary features. For example, the rehearsal assessment tool 308 can be presented with one or more musical selections representing one or more vocabulary words that were associated with the vocabulary word when the user utilized the learning toolset in order to help assist the user to remember and retrieve the vocabulary word from his/her memory. In an exemplary embodiment, the rehearsal assessment tool 308 will utilize less contextual vocabulary features than the practice question assessment so that the user receives less learning support and more practice in learning and remembering the one or more vocabulary words.

Figure 3C:
FIG. 3C is an illustrative example of an exemplary of the performance assessment tool that is presented to the user to contextually assess a user's knowledge of one or more vocabulary words according to an embodiment.

FIG. 3C is an illustrative example of an exemplary of the performance assessment tool 312 that is presented to the user to contextually assess a user's knowledge of one or more vocabulary words. The performance assessment tool 312 presents one or more vocabulary words 314 that are defined and used within a reading passage 316. In another embodiment, the performance assessment tool 312 can include a user input icon (not shown) that can hide the definition of the one or more vocabulary words 314, to allow the user to deduce the meaning of the one or more vocabulary words from the reading passage 316 to simulate vocabulary questions on a standardized test.

The reading passage 316 can be presented in a format that is similar to reading passages found on post-secondary standardized tests. The reading passage 316 creates a short story framework that integrates one or more vocabulary words 314 into the text. In one embodiment, the performance assessment tool 312 can also include some contextual vocabulary features. However, in an exemplary embodiment, the performance assessment tool 312 will utilize less contextual vocabulary features than the practice assessment tool and the rehearsal assessment tool so that the user receives less guidance and more practice in learning and remembering the one or more vocabulary words. In FIG. 3C, an image 318 is provided as a contextual vocabulary feature. The image 318 is preferably representative of the content of the reading passage 316 and/or the one or more vocabulary words 314 included within the reading passage 316. The exemplary image 318 shown in FIG. 3C is of the 1909 painting by Oscar Wergeland entitled Norsemen Landing in Iceland, and was selected in view of the vocabulary words in the accompanying passage 316 based on context. The image 318 presented can also be one that was previously associated with one or more vocabulary words 314 presented when the user utilized the learning toolset in order to help assist the user to remember and retrieve the vocabulary word(s) 314 from his/her memory. In some embodiments, the user can input a user input icon (not shown) that is presented next to the reading passage 316 that initiates the playing of an audio clip (e.g., an audio based musical segment that can be described within the reading passage 316). However, to the extent such audio clips are provided, it is more preferably for the same to be presented to the user automatically rather than in response to user input. The performance assessment tool 312 can also include one or more multiple-choice vocabulary exercises 320 that can be presented with one or more contextual vocabulary features (e.g., musical selections). The performance assessment tool 312 can include one or more radio button icons or selection icons (not shown) in order for the user to select an answer to each of the multiple-choice vocabulary questions 320 presented on the performance assessment tool 312.

FIG. 3D is an illustrative example of an exemplary master class assessment tool 324 that is presented to the user to contextually access a user's knowledge of one or more vocabulary words. The master class assessment tool 324 is presented to the user in a format that is similar to a standardized test. Unlike the other types of test assessment tools discussed above, the master class assessment tool 324 does not present the user with contextual vocabulary features. The master class assessment tool 324 is mainly utilized to demonstrate mastery of targeted vocabulary words that the user learned while utilizing the learning toolset and practiced while utilizing one or more of the practice assessment tool, the rehearsal assessment tool, and/or the performance assessment tool. The master class assessment tool 324 can include one or more multiple-choice vocabulary exercises 326 that are construed in standardized test format (e.g., stem with distractors) without any contextual functional features. The assessment interface tool 324 can include one or more radio button icons or selection icons (not shown) in order for the user to select an answer to each of the multiple-choice vocabulary exercises 326 presented in the master class assessment tool 324.

Referring back to FIG. 1, in one or more embodiments, the one or more database(s) 104 can include one or more database tables that can be accessed by one or more applications including the contextual vocabulary interface application 102. The one or more database(s) 104 includes a learning table 112 and an assessment table 114. The learning table 112 can contain a plurality of database records that contain data that is retrieved and applied by the (components of the) contextual vocabulary interface application 102 when the user is utilizing the learning toolset of the application 102. Specifically, the learning table 112 can contain one or more records that correspond to one or more vocabulary words, vocabulary learning tools, and contextual vocabulary features associated to the one or more vocabulary words and/or learning tools, etc. The assessment table 114 also contains a plurality of database records that contain data that is retrieved and applied by the (components of the) contextual vocabulary interface application 102 when the user is utilizing the assessment toolset of the application 102. Specifically, the assessment table 114 can contain one or more records that correspond to one or more vocabulary words, vocabulary assessment interfaces, and contextual vocabulary features associated to one or more vocabulary words and/or assessment tools, etc.

In one embodiment, the database(s) 104 can be hosted on one or more external database servers, web servers, data servers, domain controllers, backup servers, etc. The database(s) 104 can be accessed by the contextual vocabulary interface application 102 through the stationary computing device(s) 106 and/or the portable electronic device(s) 110 through the internet cloud via a wired or wireless (e.g., GSM, CDMA, GPRS, Wi-Fi, WiMax, 3G, and/or LTE) connection. In one or more embodiments, the database(s) 104 are connected to the web server(s) 108 that can store a plurality of data files that pertain to vocabulary words, contextual vocabulary features and assessment tools that are presented within the learning toolset and the assessment toolset. The plurality of data files can be organized into a file system that stores the data files based on their classification.

In an exemplary embodiment, the components of the contextual vocabulary interface application 102 are capable of executing and presenting various types of data file formats that include a variety of file extensions. One or more data files executed by the contextual vocabulary interface application 102 can include files containing one or more vocabulary words, assessment tools, contextual vocabulary features, and related additional data. For example, the data files can include information that is tied to vocabulary words such as definitions, word associations, etc. The plurality of data files can also include image files of various format types (e.g., JPEG, JIF, JPEG 2000, TIFF, RIF, GIF, BMP, PNG, PPM, PNM, BPG, CPT, PSD, PSP, XCF, etc.), audio files of various format types (e.g., MP3, M4A, M4P, MMF, MPC, MSV, AIFF, WAV, etc.) and video files of various format types, (e.g., AVI, FLV, WMV, MOV, MP4, etc.). The plurality of data files can further include data that pertains to font and color schemes of the one or more vocabulary words that are presented to the user on the learning toolset and/or the assessment toolset. Additionally, the plurality of data files can include various types of assessment data that are characterized by the one or more assessment tools. The assessment data files can include one or more multiple choice exercises, practice exercises, reading passages, etc. in various format types (e.g., .doc, .pages, .wp, etc.) that are presented to the user when the user is utilizing the assessment toolset.

The learning table 112 and the assessment table 114 can both include one or more records that include one or more links to the one or more data files discussed above. As will be described in more detail below, when one or more records associated with one or more specific vocabulary words and/or assessment tools is queried and one or more records are retrieved, data files that are linked to the retrieved records can be executed in order to present contextual vocabulary features, data associated to one or more vocabulary words, and/or data associated to the assessment tools to the user via the learning tools and the assessment tools.

The one or more data records of the learning table 112 and the assessment table 114 can also contain records that include a profile that is associated to the user of the contextual vocabulary interface application 102. In an exemplary embodiment, during the user's initial use of the sensory vocabulary interface application 102, the vocabulary user interface module 116 can present the user with an account creation interface. The account creation interface allows the user to create account credentials (e.g., a username and password) that can be used to login to the contextual vocabulary interface application 102. The account creation interface can also allow the user to create his/her profile that is stored within a record of the learning table 112 and the assessment table 114. The account creation interface can list a plurality of questions that allows the user to customize his/her settings when using the contextual vocabulary interface application 102. For example, the account creation interface can present the user with a question as to which standardized test the user is utilizing the application 102 to prepare for.

Each user's profile can also be populated with various account information related to the user (e.g., name, address, payment information etc.). Additionally, each user's profile can include stored values that are populated by one or more modules of the contextual vocabulary interface application 102 that are representative of vocabulary words that have been reviewed by the user within the learning toolset and/or assessment scores of one or more assessment tools completed by the user within the assessment toolset. As will be discussed in more detail below, in one embodiment, the one or more records containing each user's profile can be accessed, retrieved, and/or updated by one or more components of the contextual vocabulary interface application 102 upon each user logging into the contextual vocabulary interface application 102.

Referring again to the application 102, as discussed above, the contextual vocabulary interface application 102 also includes the vocabulary learning module 118 and the vocabulary assessment module 120. The vocabulary learning module 118 is a module that is utilized when the user accesses the learning toolset to utilize one or more learning tools. In an exemplary embodiment, the vocabulary learning module 118 can provide a query on the learning table 112 of the database(s) 104 in order to populate one or more learning tools of the vocabulary learning toolset with vocabulary words, associated definitions, associated reading passages, associated contextual vocabulary features, and other associated vocabulary words. Specifically, the vocabulary learning module 118 can provide a query on the learning table 112 of the database(s) 104 in order to retrieve and/or execute one or more associated contextual vocabulary features such as colors, formats, fonts, audio files, video files, image files, etc., that are associated to one or more vocabulary words to be presented on one or more learning tools. In an alternate embodiment, which is presently not preferred, the vocabulary learning module 118 can access third party databases (e.g., search engine databases) to query and retrieve data that is associated to the one or more vocabulary words.

In an exemplary embodiment, the assessment module 120 can provide a query on the assessment table 114 of the database(s) 104 in order to populate one or more assessment tools of the vocabulary assessment toolset with vocabulary words, associated definitions, associated multiple choice questions, associated passages, and other associated test data. The assessment module 120 can provide a query on the assessment table 114 of the database(s) 104 in order to retrieve contextual vocabulary features such as colors, formats, fonts, audio files, video files, image files, etc., that are associated to one or more vocabulary words. In addition, the assessment module 120 can access records on the assessment table 114 to create and/or update records that pertain to scores that the user achieved on the exercises presented on the assessment tools. For example, when the user takes and completes the practice assessment tool, the assessment module 120 can populate a record on the assessment table 114 with the score that the user achieves on the exercises presented on the practice assessment tool. In an alternate embodiment, which is presently not preferred, the assessment module 120 can access third party databases (e.g., search engine databases) to query and retrieve data that is associated to the one or more vocabulary words.

Figure 4:
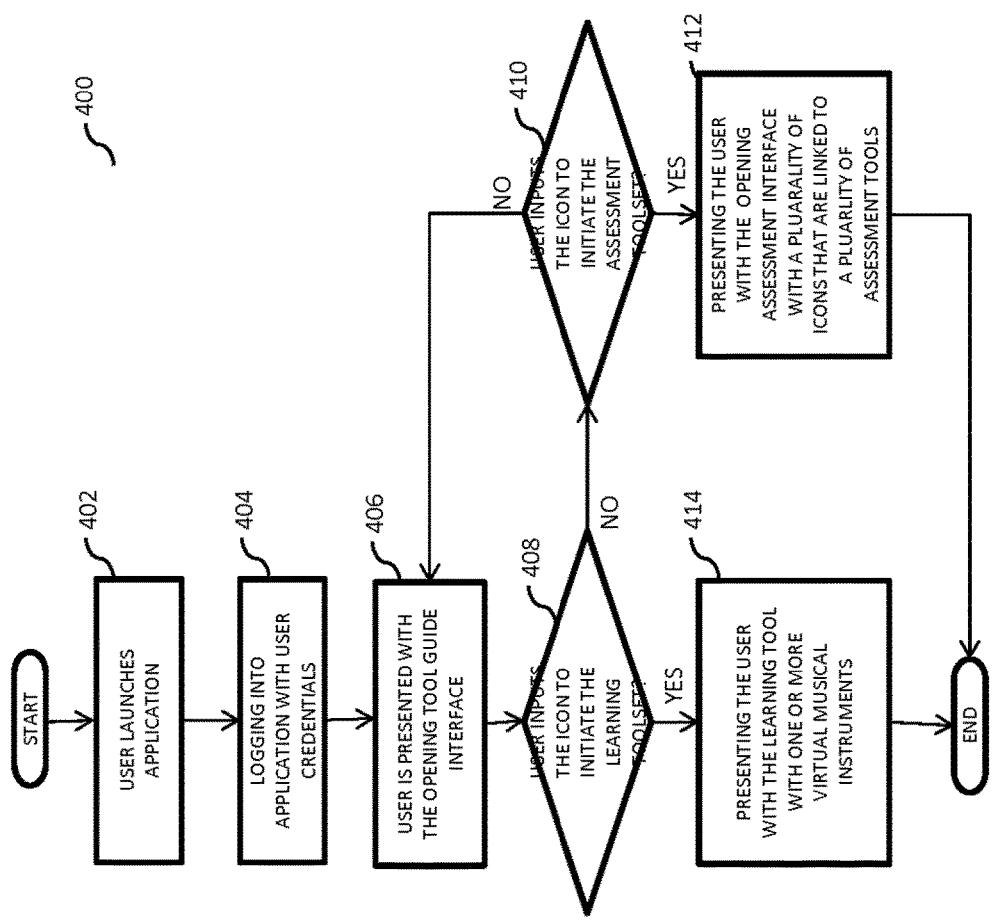
FIG. 4 is a process flow diagram of an exemplary method 400 utilized during the user of an exemplary embodiment of the contextual vocabulary interface application 102 from the operating environment of FIG. 1 according to an embodiment.

Exemplary methods of the contextual vocabulary acquisition system 100 will now be discussed in more detail with reference to FIGS. 4-7. FIG. 4 is a process flow diagram of an exemplary method 400 utilized during the use of an exemplary embodiment of the contextual vocabulary interface application 102 from the operating environment of FIG. 1 according to an embodiment. FIG. 4 will be described with reference to the components of FIG. 1, though it is to be appreciated that the method of FIG. 4 can be used with other systems/components. The method begins at block 402 wherein the user launches the contextual vocabulary interface application 102. As discussed, the user can execute the contextual vocabulary interface application 102 through one or more stationary computing devices 106 or one or more portable devices 110.

At block 404, the method includes logging into the application 102 with user credentials. The user can login to the contextual vocabulary interface application 102 using his/her user credentials that the user previously created on the account creation interface during the user's initial use of the contextual vocabulary interface application 102. At block 406, the user is presented with the opening tool guide interface. In one embodiment, the opening tool guide can include a plurality of user input icons. The user can input one of the user input icons to access and utilize the learning toolset and/or the assessment toolset.

At block 408, the method includes determining if the user inputs the icon to initiate the learning toolset. If it is determined that the user does input the user input icon to initiate the learning toolset (at block 408), at block 414, the method includes presenting the user with the learning tool (e.g. with one or more virtual musical instruments). In one embodiment, the vocabulary learning module 118 can access the database(s) 104 and perform a query on the learning table 112 to select one or more records of one or more vocabulary words to present to the user. Upon selection of the one or more vocabulary words, the vocabulary user interface module 116 can present the learning tool to the user that presents the one or more vocabulary words along with additional data and applicable contextual vocabulary features. As discussed below (with respect to FIG. 5), the learning tool can include one or more user input icons that can be presented to the user in order for the user to initiate one or more contextual vocabulary features.

If it is determined that the user does not input the icon to initiate the learning toolset (at block 408), at block 410 it is further determined if the user inputs the icon to initiate the assessment toolset. If it is determined that the user inputs the user input icon to initiate the assessment toolset (at block 410), at block 412, the method includes presenting the user with the opening assessment interface with a plurality of icons that are linked to a plurality of assessment tools. In one embodiment, when the user initiates the vocabulary assessment toolset, the vocabulary user interface module 116 presents the opening assessment interface that includes a plurality of user input icons that are linked to a plurality of assessment tools that the user can input and utilize. As discussed below (with respect to FIG. 6), in one embodiment, the user can input one of the user input icons to initiate and utilize one of the assessment tools.

Figure 5:
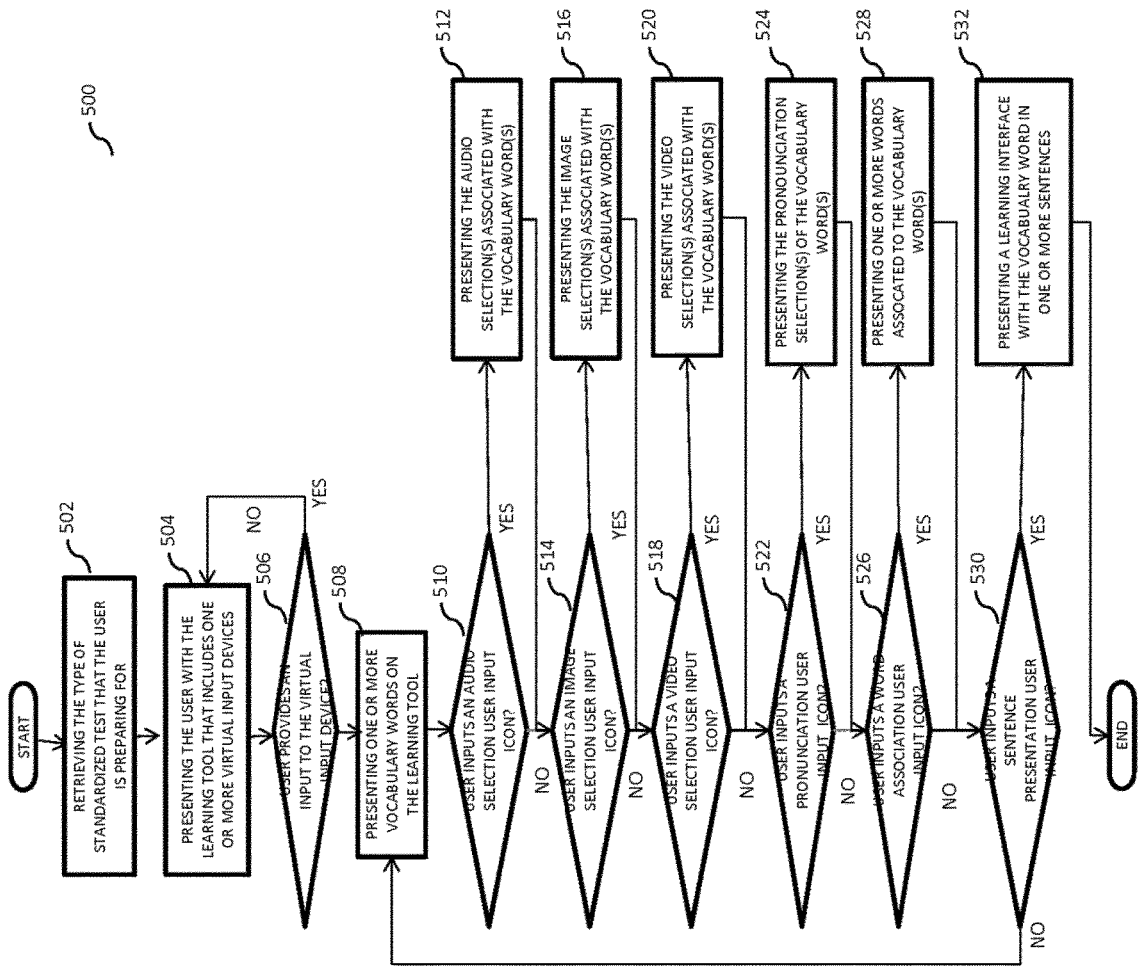
FIG. 5 is a process flow diagram of an exemplary method utilized during the user of an exemplary embodiment of the learning toolset of the contextual vocabulary interface application from the operating environment of FIG. 1 according to an embodiment.

FIG. 5 is a process flow diagram of an exemplary method 500 utilized during the user of an exemplary embodiment of the learning toolset of the contextual vocabulary interface application 102 from the operating environment of FIG. 1 according to an embodiment. FIG. 5 will be described with reference to the components of FIG. 1, though it is to be appreciated that the method of FIG. 5 can be used with other systems/components. In the method 500 of FIG. 5, a specific order of determining a plurality of contextual vocabulary features to be implemented are shown, however, it is understood that the method and systems described herein can determine the plurality of contextual vocabulary features to be implemented in any order. It is also understood that some of the process steps of determining a plurality of contextual vocabulary features can be omitted from the method 500 as one or more vocabulary words may not be associated with all of the contextual vocabulary features that are determined in the method 500. Additionally, it is to be understood that the method 500 is a non-limiting exemplary embodiment since additional contextual vocabulary features that are not determined within the process steps of the method 500 can be implemented with respect to one or more vocabulary words.

The process starts at block 502, wherein the method includes retrieving the type of standardized test that the user is preparing for. As discussed above, the learning table 112 can include a record that contains a profile that is associated to the user. In one embodiment, the vocabulary learning module 118 performs a query on the learning table 112 of the database(s) 104 to search for the record containing the user's profile to determine which standardized test the user is preparing for in order to present one or more vocabulary words that are utilized to prepare for the specific standardized test. For example, in one embodiment the list of vocabulary words that are utilized to prepare for the SAT® test may differ than the list of vocabulary words that are utilized to prepare for the GRE® test. However, since vocabulary words utilized on such tests are similar in many instances, it may also be the case that the same vocabulary set is utilized for multiple standardized tests. If applicable, the vocabulary learning module 118 can also determine which vocabulary words the user has previously reviewed within the learning toolset from the user's profile.

At block 504, the method includes presenting the user with the learning tool that includes one or more virtual input devices. As discussed above (with respect to block 414), if it is determined that the user inputs the icon to initiate the learning toolset on the opening tool guide interface, the vocabulary user interface module 116 presents the user with the learning tool. The learning tool can include one or more virtual input devices (e.g., virtual musical instruments) that the user can input (by clicking, swiping, etc.) in order to start learning vocabulary words.

At block 506, the method includes determining if the user provides an input to the virtual input device. In one embodiment, the user can provide an input by selecting one or more user input icons of the virtual input device. For example, the user can be presented with a virtual piano on which the user can input one or more virtual keys of the virtual musical instrument. If it is determined that the user provides an input to the virtual input device (at block 506), at block 508, the method includes presenting a one or more vocabulary words on the learning tool. In one embodiment, the vocabulary learning module 118 presents a query on the learning table 112 of the database(s) 104 to search for the record containing the user's profile to determine which subset of vocabulary words to present to the user.

Specifically, the vocabulary learning module 118 provides a query on the learning table 112 to retrieve one or more records of one or more vocabulary words that pertain to the standardized test the user is preparing for (as determined in block 502) in order to obtain a list of vocabulary words that apply to the specific test. In one embodiment, the vocabulary learning module 118 can select one or more vocabulary words to utilize during the session in which the user is utilizing the application 102. For example, the vocabulary learning module 118 can access a list of five thousand vocabulary words that can be used to prepare for the user's standardized test. The vocabulary learning module 118 can then select a subset of vocabulary words (e.g., fifty words) from the list of five thousand vocabulary words to present to the user on one or more learning tools presented to the user before selecting a new list of additional vocabulary words as needed. More preferably, the subsets of vocabulary words are pre-determined by the system, and are presented to the user in such manner.

The vocabulary learning module 118 can also access the record containing the user's profile on the learning table 112 and on the assessment table 114 in order to update the records with the dataset of vocabulary words that have been presented to the user during the user's utilization of the learning toolset. In some embodiments, the user can utilize a review session of the learning toolset wherein the vocabulary learning module 118 queries the learning table 112 for the record containing the user's profile to retrieve the dataset of vocabulary words that have been presented to the user so that the user can review words that he/she has already learned during a previous use of the learning toolset. Additionally, as further discussed below, this functionality ensures that when the user utilizes the assessment toolset, the user is assessed on vocabulary words that have already been presented to the user and that the user has previously learned.

In an exemplary embodiment, upon selecting one or more vocabulary words to utilize during the session, the vocabulary learning module 118 can communicate with the vocabulary interface module 116 to present one or more vocabulary words that are synchronously or immediately successively presented along with a brief definition of the word (as shown in FIG. 2A). In one or more embodiments the vocabulary word(s) can be presented as color-coded and can additionally be presented with the part(s) of speech of the vocabulary word(s) (e.g., noun, verb, adjective, etc.), and a brief definition of the vocabulary word(s). In addition to presenting the vocabulary word(s) and related information, in one embodiment, the vocabulary user interface module 116 can present the user with a plurality of user input icons that can be inputted by the user to initiate specific types of contextual vocabulary features. In another embodiment, the vocabulary user interface module 116 can present the user with the virtual input device (e.g., virtual musical instrument) in order for the user to input the selection to initiate specific types of contextual vocabulary features. For example, the virtual Input device may be presented as a virtual musical instrument that presents a set of keys tuned to match those of an actual instrument that can be used to initiate specific types of contextual vocabulary features.

At block 510, the method includes determining if the user inputs an audio selection user input icon. In one embodiment, the vocabulary user interface module 116 can present the user with the user input icon to initiate an associated audio selection(s) as a contextual vocabulary feature that is associated with the displayed vocabulary word(s) on the learning tool. In another embodiment, the vocabulary user interface module 116 can present the user with the virtual input device in order for the user to input the selection to initiate the associated audio selection(s).

If it is determined that the user inputs the audio selection user input icon (at block 510), at block 512, the method includes presenting the audio selection(s) associated with the vocabulary word(s). As described above, each vocabulary word includes a record within the learning table 112 of the database(s) 104. Each of the records that correspond to each of the vocabulary words contain one or more links to a plurality of contextual vocabulary feature files that are stored on the web server(s) 108 and can be accessed and executed by the vocabulary learning module 118. In one embodiment, upon the user inputting the audio selection icon on the learning tool, the vocabulary learning module 118 accesses the database(s) 104 and queries the learning table 112 for the record(s) containing the vocabulary word(s) presented on the learning tool. Upon retrieving the record(s) containing the vocabulary word(s) presented on the learning tool, the vocabulary learning module 118 determines an audio file(s) that is linked within the record(s) and executes the audio file(s) from the web server(s) 108. Upon execution of the audio file(s), one or more audio selections associated to the one or more vocabulary words are presented simultaneously to the user. The audio selection can include a sound clip or a brief musical segment that reinforces the association between the vocabulary word(s) presented on the learning tool and the definition.

At block 514, the method includes determining if the user inputs an image selection user input icon. In one embodiment, the vocabulary user interface module 116 can present the user with a user interface icon to initiate an associated image selection as a contextual vocabulary feature that is associated with the displayed vocabulary word.

If it is determined that the user does input the image selection icon (at block 514), at block 516, the method includes presenting an image selection(s) associated with the vocabulary word(s). In one embodiment, upon the user inputting the image selection user input icon on the learning tool, the vocabulary learning module 118 accesses the database(s) 104 and queries the learning table 112 for a record containing the vocabulary word(s) presented on the learning tool. Upon retrieving the record(s) containing the vocabulary word(s) presented on the learning tool, the vocabulary learning module 118 determines an image file that is linked within the record(s) and executes the image file(s) from the web server(s) 108. Upon execution of the image file(s), the image selection(s) that is associated to the vocabulary word(s) is presented to the user on the learning tool. The image selection(s) can include a picture or artwork that reinforces the association between the word and the definition.

At block 518, the method includes determining if the user inputs a video selection user input icon. In one embodiment, the vocabulary user interface module 116 can present the user with the user input icon to initiate an associated video selection(s) as a contextual vocabulary feature that is associated with the vocabulary word(s) presented on the learning tool. In another embodiment, the vocabulary user interface module 116 can present the user with the virtual input device in order for the user to input the selection to initiate the associated video selection(s).

If it is determined that the user does input the video selection icon (at block 518), at block 520, the method includes presenting the video selection(s) associated with the vocabulary word(s). In one embodiment, upon the user inputting the video selection icon on the learning tool, the vocabulary learning module 118 accesses the database(s) 104 and queries the learning table 112 for a record containing the vocabulary word(s) presented on the learning tool. Upon retrieving the record containing the vocabulary word(s) presented on the learning tool, the vocabulary learning module 118 determines a video file(s) that is linked within the record and executes the video file(s) from the web server(s) 108. Upon execution of the video file(s), the video selection(s) that is associated to the vocabulary word(s) is presented to the user. The video selection(s) can include a short video clip (e.g., movie clip, media clip) that reinforces the association between the word and its meaning.

At block 522, the method includes determining if the user inputs a pronunciation user input icon. In one embodiment, the vocabulary user interface module 116 can present the user with the user input icon to initiate pronunciation selection(s) as a contextual vocabulary feature that is associated with the vocabulary word(s) presented on the learning tool. In another embodiment, the vocabulary user interface module 116 can present the user with the virtual input device in order for the user to input the selection to initiate the associated pronunciation selection(s).

If it is determined that the user does input the pronunciation user interface icon (at block 522), at block 524, the method includes presenting the pronunciation selection(s) of the vocabulary word(s). Specifically, upon the user inputting the pronunciation user interface icon on the learning tool, the vocabulary learning module 118 accesses the database(s) 104 and queries the learning table 112 for a record containing the vocabulary word(s) presented on the learning tool. Upon retrieving the record(s) containing the vocabulary word(s) presented on the learning tool, the vocabulary learning module 118 determines an audio file(s) that is classified as the pronunciation of the vocabulary word(s) and is linked within the record(s). For example, the audio file(s) can include a MP3 file(s) that is classified by the word (e.g., ominous.pronounce.mp3). The vocabulary learning module 118 executes the audio file(s) from the web server(s) 108. Upon execution of the audio file(s), the pronunciation selection(s) of the vocabulary word(s) is presented to the user for the user to hear.

At block 526, it is determined if the user inputs a word association user input icon. In one embodiment, the vocabulary user interface module 116 can present the user with the word association user input icon to initiate the presentation of a list of associated words (including other vocabulary words) that are associated with the vocabulary word(s) presented on the learning tool. In another embodiment, the vocabulary user interface module 116 can present the user with the virtual input device in order for the user to input the selection to initiate the presentation of a list of words that are associated to the vocabulary word(s) presented on the learning tool.

If it is determined that the user does input the icon to initiate the presentation of associated words (at block 526), at block 528, the method includes presenting one or more words associated to the vocabulary word(s). In one or more embodiments, each record of a particular vocabulary word within the learning table 112 of the database(s) 104 also contains one or more links to other records of vocabulary words and non-vocabulary words that are associated to the particular vocabulary word. Specifically, upon the user inputting the word association user input icon on the learning tool, the vocabulary learning module 118 accesses the database(s) 104 and queries the learning table 112 for the record(s) containing the vocabulary word(s) presented on the learning tool. Upon retrieving the record(s) containing the vocabulary word(s) presented on the learning tool, the vocabulary learning module 118 determines the words that are associated to the displayed vocabulary word(s) that are linked within the record(s). The vocabulary learning module 118 can present a list of the associated words on the learning tool. The associated words can include synonyms, homonyms, and homophones that can be presented to the user with additional contextual vocabulary features to help the user learn the vocabulary word(s) presented on the learning tool (in addition to learning other vocabulary words).

At block 530, it is determined if the user inputs a sentence presentation icon. In one embodiment, the vocabulary user interface module 116 can present the user with the sentence presentation user input icon to initiate the presentation of another learning tool that displays one or more sentences that includes the vocabulary word(s) that is presented on the learning tool (as shown in FIG. 2B). In another embodiment, the vocabulary user interface module 116 can present the user with the virtual input device in order for the user to input the selection to initiate the sentence presentation.

If it is determined that the user inputs the sentence presentation user input icon (at block 530), at block 532, the method includes presenting a learning tool with the vocabulary word(s) in one or more sentences. In one or more embodiments, each record of a particular vocabulary word within the learning table 112 of the database(s) 104 also contains one or more links to one or more data files that contains one or more corresponding sentences (i.e., sentences that include the vocabulary word presented on the learning tool). Specifically, upon the user inputting the sentence presentation user input icon on the learning tool, the vocabulary learning module 118 accesses the database(s) 104 and queries the learning table 112 for the record(s) containing the vocabulary word(s) presented on the learning tool. Upon retrieving the record(s) containing the vocabulary word(s) presented on the learning tool, the vocabulary learning module 118 executes the data file(s) containing the corresponding sentences. Upon execution of the data file(s), the vocabulary learning module 118 utilizes the vocabulary user interface module 116 to present another learning tool (as shown in FIG. 2B) that includes one or more sentences that include the vocabulary word(s) presented to the user on the learning tool. The vocabulary word(s) can be presented in a color coded format that include one or more contextual vocabulary features that can be utilized by the user on the learning tool. For example, as one or more sentences are presented on the learning tool, an audio based musical segment can be presented that is described within the sentence.

If it is determined that the user does not input the sentence presentation icon (at block 530), the method returns to block 508 wherein the vocabulary word is displayed on the learning tool. As discussed above, the vocabulary learning module 118 accesses the record containing the user's profile on the learning table 112 and on the assessment table 114 and can update the record of the vocabulary word(s) that has not been already presented to the user on the learning tool. The vocabulary learning module 118 can select a vocabulary word(s) from a list of words that has not already been presented to the user to ensure that the user is learning a new vocabulary word(s). As the new vocabulary word(s) is displayed on the learning tool, the user can once again utilize one or more contextual vocabulary features with respect to the new vocabulary word (per blocks 510-532).

Figure 6:
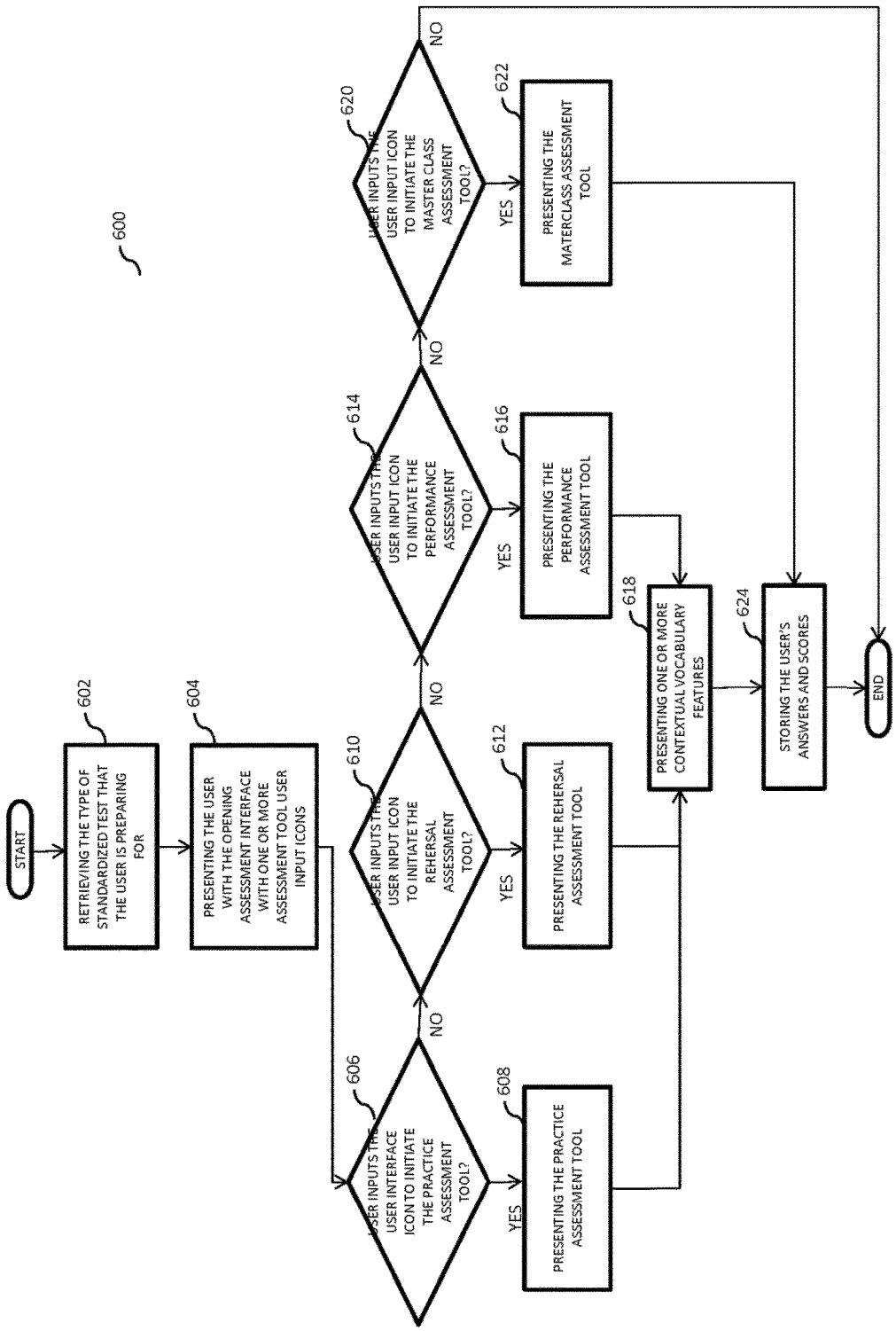
FIG. 6 is a process flow diagram of an exemplary method utilized during the user of an exemplary embodiment of the assessment toolset of the contextual vocabulary interface application from the operating environment of FIG. 1 according to an embodiment.

FIG. 6 is a process flow diagram of an exemplary method 600 utilized during an exemplary embodiment of the assessment toolset of the contextual vocabulary interface application 102 from the operating environment of FIG. 1 according to an embodiment. FIG. 6 will be described with reference to the components of FIG. 1, though it is to be appreciated that the method of FIG. 6 can be used with other systems/components. In the method 600 of FIG. 6, a specific order of determining assessment tools that can be implemented by the user is shown, however, it is understood that the method and systems described herein can determine the assessment tools that can be implemented by the user in any order.

The process starts at block 602, wherein the method includes retrieving the type of standardized test that the user is preparing for. As discussed above, the assessment table 114 can include a record that contains a profile that is associated to the user. In one embodiment, the vocabulary assessment module 120 presents a query on the assessment table 114 of the database(s) 104 to search for the record containing the user's profile to determine which subset of vocabulary words the user has been learning. Specifically, the vocabulary assessment module 120 determines which standardized test the user is preparing for in order to present one or more practice exercises within the vocabulary assessment tools that apply to the preparation of the standardized test. The vocabulary assessment module 120 can also perform a query on the learning table 112 and/or the assessment table 114 to determine the record containing the user's profile in order to determine which vocabulary words the user has reviewed within the learning toolset. Upon determining which standardized test the user is preparing for and which vocabulary words the user has already reviewed, the vocabulary assessment module 120 queries the learning table 112 and/or the assessment table 114 for vocabulary words that are utilized to prepare for the standardized test and that were already reviewed by the user.

At block 604, the method includes presenting the user with the opening assessment interface with one or more assessment tool user input icons. As discussed above (with respect to block 412 of FIG. 4), if it is determined that the user inputs the user input icon to initiate the assessment toolset on the opening tool guide interface, the vocabulary user interface module 116 presents the user with the opening assessment interface. The opening assessment interface includes a plurality of user input icons that are linked to a plurality of assessment tools. As discussed below, when one of the plurality of user input icons are input, the vocabulary user interface module 116 can execute and initialize a respective assessment tool to be presented to the user.

At block 606, it is determined if the user inputs the user interface icon to execute the practice assessment tool. If it is determined that the user inputs the user interface icon to execute the practice assessment tool (at block 606), at block 608, the method includes presenting the practice assessment tool. Specifically, one or more practice assessment tools that apply to the preparation for a specific type of standardized test include one or more corresponding records within the assessment table 114 of the database(s) 104. Each record can contain one or more links to one or more data files that contain a plurality of practice assessment exercises. Additionally each record can contain one or more links to one or more contextual vocabulary feature files that are stored on the web server(s) 108.

In one embodiment, upon receiving the user's input to initiate the practice assessment tool, the vocabulary assessment module 120 performs a query on the records on the assessment table 114 that are determined to contain one or more links to data files and context vocabulary features files that apply to vocabulary words that were previously reviewed by the user within the learning toolset for a standardized test. The vocabulary assessment module 120 executes the data file(s) and selects a plurality of practice assessment exercises (utilizing the applicable vocabulary words) to present to the user. The vocabulary assessment module 120 utilizes the vocabulary user interface module 116 to present the user with the practice assessment tool. The practice assessment tool (as shown in FIG. 3A) can be presented with one or more exercises.

At block 618, the method includes presenting one or more contextual vocabulary features. In an exemplary embodiment, upon retrieving one or more records containing one or more links to data files and one or more contextual vocabulary feature files, the assessment module 120 executes the contextual vocabulary feature file(s) corresponding to the selected exercises presented on the practice assessment tool. Upon execution of the contextual vocabulary feature file(s) the contextual vocabulary features that correspond to the exercises are presented on the practice assessment tool.

At block 624, the method includes storing user's answers and scores. In one embodiment, upon the user completing the practice assessment tool, the vocabulary assessment module 120 queries the assessment table 114 for the record containing the user's profile and updates the record with a dataset that contains the user's answers to the exercises and the score the user attained during the completion of exercises presented on the practice assessment tool. In some embodiments, when the user completes the exercises presented on the practice assessment tool, the vocabulary user interface module 116 can present the user with the assessment interface that includes a scoring sheet that can include practice assessment tool scores, trends over time, and other relevant data pertaining to the user's performance of the practice assessment tool.

Referring again to block 606, if it is determined that the user does not input the user input icon to initiate the practice assessment tool, at block 610, the method determines if the user inputs the icon to initiate the rehearsal assessment tool. If it is determined that the user inputs the icon to execute the rehearsal assessment tool (at block 610), at block 612, the method includes presenting the rehearsal assessment tool. Specifically, one or more rehearsal assessment tools that apply to the preparation for a specific type of standardized test include one or more corresponding records within the assessment table 114 of the database(s) 104. Each record can contain one or more links to one or more data files that contain a plurality of rehearsal assessment exercises. Additionally each record can contain one or more links to one or more contextual vocabulary feature files that are stored on the web server(s) 108.

In one embodiment, upon receiving the user's input to initiate the rehearsal assessment tool, the vocabulary assessment module 120 performs a query on the records on the assessment table 114 that are determined to contain one or more links to data files and context vocabulary features files that apply to vocabulary words that were previously reviewed by the user within the learning toolset and/or that are relevant to the standardized test that the user is preparing for. The vocabulary assessment module 120 executes the data file(s) and selects a plurality of rehearsal assessment exercises (utilizing the applicable vocabulary words) to present to the user. The vocabulary assessment module 120 utilizes the vocabulary user interface module 116 to present the user with the rehearsal assessment tool. The rehearsal assessment tool (as shown in FIG. 3B) can present the user with one or more exercises.

At block 618, the method includes presenting one or more contextual vocabulary features. In an exemplary embodiment, upon retrieving one or more records containing one or more links to data files and one or more contextual vocabulary feature files, the assessment module 120 executes the contextual vocabulary feature file(s) corresponding to the selected exercises presented on the rehearsal assessment tool. Upon execution of the contextual vocabulary feature file(s) the contextual vocabulary feature(s) that correspond to the exercises are presented on the rehearsal assessment tool.

At block 624, the method includes storing user's answers and scores. In one embodiment, upon the user completing the rehearsal assessment tool, the vocabulary assessment module 120 queries the assessment table 114 for the record containing the user's profile and updates the record with a dataset that contains the user's answers to the exercises and the score the user attained during the completion of exercises presented on the rehearsal assessment tool. In some embodiments, when the user completes the exercises presented on the rehearsal assessment tool, the vocabulary user interface module 116 can present the user with the assessment interface that includes a scoring sheet that can include rehearsal assessment tool scores, trends over time, and other relevant data pertaining to the user's performance of the rehearsal assessment tool.

Referring again to block 610, if it is determined that the user does not input the user input icon to initiate the rehearsal assessment tool, at block 614, the method determines if the user inputs the user input icon to initiate the performance assessment. If it is determined that the user inputs the user input icon to execute the performance assessment (at block 614), at block 616, the method includes presenting the performance assessment tool. Specifically, one or more performance assessment tools that apply to the preparation for a specific type of standardized test includes one or more corresponding records within the assessment table 114 of the database(s) 104. The corresponding records can include links to one or more data files that contain one or more performance assessment reading passages and associated exercises along with one or more contextual vocabulary feature files.

In one embodiment, upon receiving the user's input to initiate the performance assessment, the vocabulary assessment module 120 performs a query on the subset of records on the assessment table 114 that are determined to contain links to data files and context vocabulary features files that apply to vocabulary words that were previously reviewed by the user within the learning toolset and/or that are relevant to the standardized test that the user is preparing for. The vocabulary assessment module 120 executes the data file(s) and selects a plurality of reading passages and associated performance assessment exercises (utilizing the applicable vocabulary words) to present to the user. The vocabulary assessment module 120 utilizes the vocabulary user interface module 116 to present the user with the performance assessment tool. The performance assessment module 120 can present the user with one or more reading passages and one or more associated exercises (as shown in FIG. 3C).

At block 618, the method includes presenting one or more contextual vocabulary features. In an exemplary embodiment, upon retrieving one or more records containing one or more links to data files and one or more contextual vocabulary feature files, the assessment module 120 executes the contextual vocabulary feature file(s) corresponding to the selected reading passages and associated exercises presented on the performance assessment tool. Upon execution of the contextual vocabulary feature file(s) the contextual vocabulary features that correspond to the reading passages and associated exercises are presented on the practice assessment tool.

At block 624, the method includes storing user's answers and scores. In one embodiment, upon the user completing the rehearsal assessment tool, the vocabulary assessment module 120 queries the assessment table 114 for the record containing the user's profile and updates the record with a dataset that contains the user's answers to the exercises and the score the user attained during the completion of exercises presented on the rehearsal assessment tool. In some embodiments, when the user completes the exercises presented on the rehearsal assessment tool, the vocabulary user interface module 116 can present the user with the assessment interface that includes a scoring sheet that can include rehearsal assessment tool scores, trends over time, and other relevant data pertaining to the user's performance of the performance assessment tool.

Referring again to block 614, if it is determined that the user does not input the icon to initiate the performance assessment tool, at block 620, the method determines if the user inputs the icon to initiate the master class assessment tool. If it is determined that the user inputs the icon to execute the master class assessment tool (at block 620), at block 622, the method includes presenting the master class assessment tool. Specifically, one or more master class assessment tools that apply to the preparation for a specific type of standardized test include one or more corresponding records within the assessment table 114 of the database(s) 104. Each record can contain one or more links to one or more data files that contain a plurality of master class assessment exercises.

In one embodiment, upon receiving the user's input to initiate the master class assessment, the vocabulary assessment module 120 performs a query on the subset of records on assessment table 114 that are determined to contain links to data files and context vocabulary features files that apply to vocabulary words that were previously reviewed by the user within the learning toolset for a standardized test. The vocabulary assessment module 120 executes the data file(s) and selects a plurality of practice assessment exercises (utilizing the applicable vocabulary words) to present to the user. The vocabulary assessment module 120 utilizes the vocabulary user interface module 116 to present the user with the master class assessment tool. The master class assessment (as shown in FIG. 3D) can present the user with one or more associated exercises in the form of multiple choice questions. As discussed above, the master class assessment does not utilize any contextual vocabulary features in order to provide a simulated version of vocabulary questions on the standardized test.

At block 624, the method includes storing user's answers and scores. In one embodiment, upon the user completing the master class assessment tool, the vocabulary assessment module 120 queries the assessment table 114 for the record containing the user's profile and updates the record with a dataset that contains the user's answers to the exercises and the score the user attained during the completion of exercises presented on the master class assessment tool. In some embodiments, when the user completes the exercises presented on the master class assessment tool, the vocabulary user interface module 116 can present the user with the assessment interface that includes a scoring sheet that can include master class assessment tool scores, trends over time, and other relevant data pertaining to the user's performance of the master class assessment tool.

Figure 7:
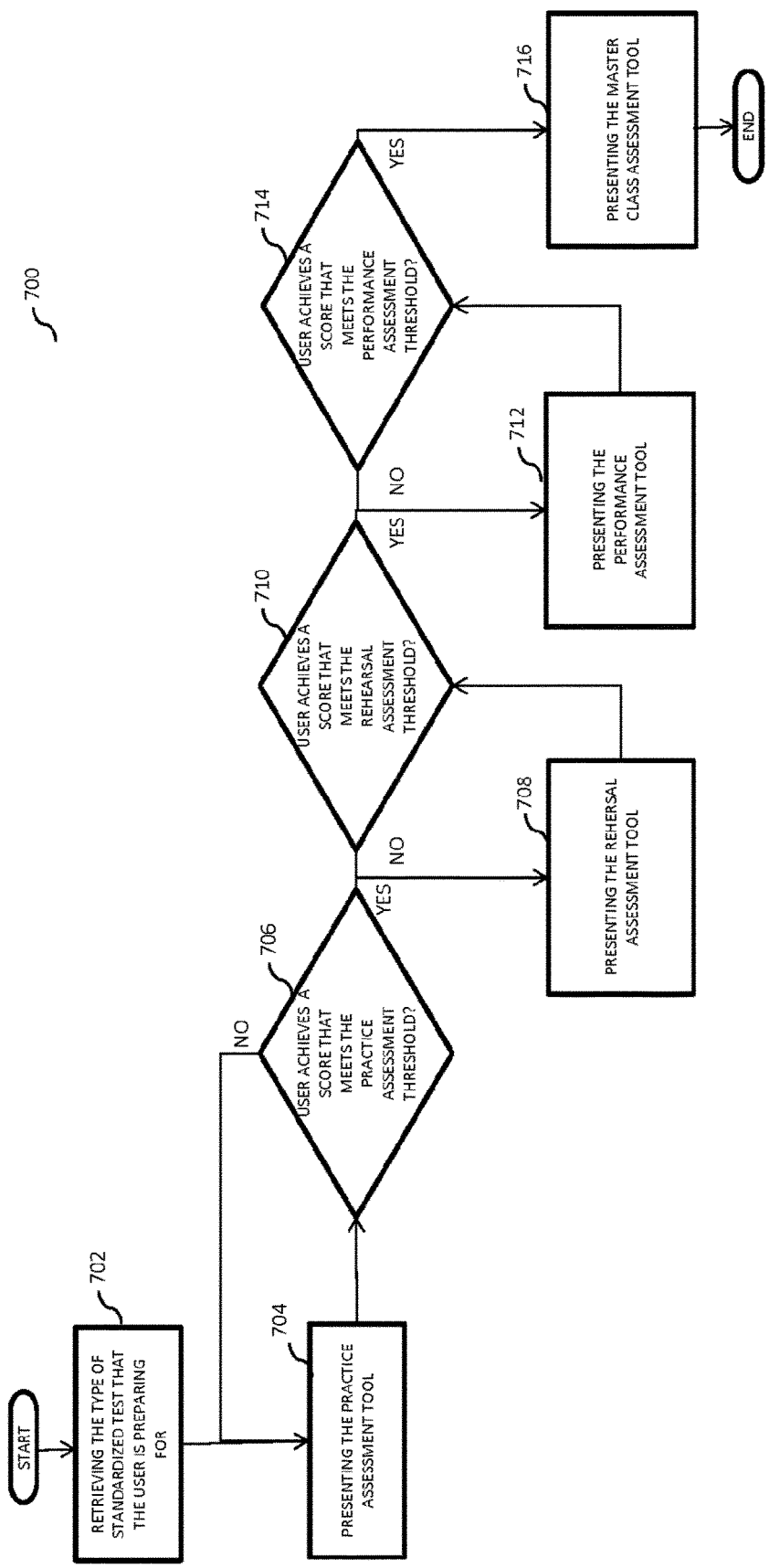
FIG. 7 is a process flow diagram of an exemplary method utilized during the use of an exemplary embodiment utilizing assessment advancement thresholds within the assessment toolset of the contextual vocabulary interface application from the operating environment of FIG. 1 according to an embodiment.

FIG. 7 is a process flow diagram of an exemplary method 700 utilized during the use of an exemplary embodiment utilizing assessment advancement thresholds within the assessment toolset of the contextual vocabulary interface application 102 from the operating environment of FIG. 1 according to an embodiment. FIG. 7 will be described with reference to the components of FIG. 1, though it is to be appreciated that the method of FIG. 7 can be used with other systems/components. In one or more embodiments of the contextual vocabulary interface application 102 requires the user to complete the assessment toolset in a specific order from assessment tools ranging from the least difficult assessment type (practice assessment) that presents the most cognitive vocabulary features to the most difficult assessment type that presents no cognitive vocabulary features (master class assessment). Specifically, the vocabulary assessment module 120 can assign assessment advancement thresholds that are tied to the user's score achieved on each of the exercises presented on the vocabulary assessment tools. The advancement thresholds can include a practice assessment threshold associated with the practice assessment tool, a rehearsal assessment threshold associated with the rehearsal assessment tool, and a performance assessment threshold associated with the performance assessment tool. When a user completes each section of the learning module 118 with an acceptable score, the user is allowed to progress to the next section. The subsequent section may not ordinarily be of a higher difficulty, but may be appropriate for the reinforcement of vocabulary acquisition for the given situation. It will be appreciated that vocabulary lists for standardized tests such as the SAT®, GRE® and TOEFL® have significant overlap. But there is no definitive "list" for a particular standardized test. There are, however, words that occur more frequently across standardized tests. And these words are preferably utilized in the system.

The process starts at block 702, wherein the method includes retrieving the type of standardized test that the user is preparing for. As discussed above, the assessment table 114 can include a record that contains a profile that is associated to the user. In one embodiment, the vocabulary assessment module 120 presents a query on the assessment table 114 of the database(s) 104 to search for the record containing the user's profile to determine which subset of vocabulary words the user has been learning. Specifically, the vocabulary assessment module 120 determines which standardized test the user is preparing for in order to present one or more exercises within the vocabulary assessment tools that are suitable for preparation for vocabulary questions on the standardized test. The vocabulary assessment module 120 can also perform a query on the learning table 112 and/or the assessment table 114 to determine the record containing the user's profile in order to determine which vocabulary words the user has reviewed within the learning toolset. Upon determining which standardized test the user is preparing for and which vocabulary words the user has already reviewed, the vocabulary assessment module 120 queries the learning table 112 for records containing vocabulary words that are utilized to prepare for the standardized test and, optionally, that were already reviewed by the user.

At block 704, the method includes presenting the practice assessment tool. In one embodiment, the vocabulary assessment module 120 performs a query on the subset of records on the assessment table 114 that are determined to contain links to data files and context vocabulary features files that apply to vocabulary words that were previously reviewed by the user within the learning toolset for a standardized test. The vocabulary assessment module 120 executes the data file(s) and selects a plurality of practice assessment exercises (utilizing the applicable vocabulary words) to present to the user. The vocabulary assessment module 120 utilizes the vocabulary user interface module 116 to present the user with the practice assessment tool.

At block 706, the method includes determining if the user achieves a score that meets the practice assessment threshold. If it is determined that the user's score does not meet the practice assessment threshold (at block 706), the method returns to block 704, where the method once again includes presenting the practice assessment tool. If it is determined that the user's score meets the practice threshold requirement (at block 706), at block 708, the method includes presenting the rehearsal assessment tool.

In one embodiment, upon the user completing the practice assessment tool presented on the assessment interface, the vocabulary assessment module 120 queries the assessment table 114 for the record containing the user's profile and updates the record with a dataset that contains the user's answers to the exercises and the user's score achieved on the practice assessment tool. Therefore, if the user ends his/her session, and starts a new session of the assessment toolset at a future time, the vocabulary assessment module 120 can retrieve the user's profile to determine that the rehearsal assessment tool can be presented to the user (based on meeting the threshold requirement at block 706). Additionally, the vocabulary assessment module 120 performs a query on the subset of records on assessment table 114 that are determined to contain links to data files and context vocabulary features files that apply to vocabulary words that were previously reviewed by the user within the learning toolset for a standardized test. The vocabulary assessment module 120 executes the data file(s) and selects a plurality of rehearsal assessment exercises (utilizing the applicable vocabulary words) to present to the user. The vocabulary assessment module 120 utilizes the vocabulary user interface module 116 to present the user with the rehearsal assessment tool.

At block 710, the method includes determining if the user achieves a score that meets the rehearsal assessment threshold. If it is determined that the user's score does not meet the rehearsal assessment threshold (at block 710), the method returns to block 708, where the method once again includes presenting the rehearsal assessment tool. If is determined if the user's score meets the rehearsal assessment threshold requirement (at block 710), at block 712, the method includes presenting the performance assessment tool.

In one embodiment, upon the user completing the rehearsal assessment tool presented on the assessment interface, the vocabulary assessment module 120 queries the assessment table 114 for the record containing the user's profile and updates the record with a dataset that contains the user's answers to the exercises and the user's score achieved on the rehearsal assessment tool. Therefore, if the user ends his/her session, and starts a new session of the assessment toolset at a future time, the vocabulary assessment module 120 can retrieve the user's profile to determine that the performance assessment can be presented to the user (based on meeting the threshold requirement at block 710). Additionally, the vocabulary assessment module 120 performs a query on the subset of records on the assessment table 114 that are determined to contain links to data files and context vocabulary features files that apply to vocabulary words that were previously reviewed by the user within the learning toolset for a standardized test. The vocabulary assessment module 120 executes the data file(s) and selects a plurality of reading passages and associated performance exercises (utilizing the applicable vocabulary words) to present to the user. The vocabulary assessment module 120 utilizes the vocabulary user interface module 116 to present the user with the performance assessment tool.

At block 714, the method includes determining if the user's score meets the performance assessment threshold. If it is determined that the user's score does not meet the performance assessment threshold (at block 714), the method returns to block 712, where the method once again includes presents the performance assessment tool on the assessment interface. If is determined if the user's score meets the performance assessment threshold requirement (at block 714), at block 716, the method includes presenting the master class assessment tool.

In one embodiment, upon the user completing the performance assessment presented on the assessment interface, the vocabulary assessment module 120 queries the assessment table 114 for the record containing the user's profile and updates the record with a dataset that contains the user's answers to the exercises and the user's score achieved on the performance assessment tool. Therefore, if the user ends his/her session, and starts a new session of the assessment toolset at a future time, the vocabulary assessment module 120 can retrieve the user's profile to determine that the master class assessment can be presented to the user (based on meeting the threshold requirement at block 714).

Additionally, the vocabulary assessment module 120 performs a query on the subset of records on the assessment table 114 that are determined to contain links to data files and context vocabulary features files that apply to vocabulary words that were previously reviewed by the user within the learning toolset and/or that are relevant to the standardized test that the user is preparing for. The vocabulary assessment module 120 executes the data file(s) and selects a plurality of master class assessment exercises (utilizing the applicable vocabulary words) to present to the user. The vocabulary assessment module 120 utilizes the vocabulary user interface module 116 to present the user with the master class assessment tool.

As discussed, various embodiments of the contextual vocabulary interface application 102 can be utilized to provide the user with contextual vocabulary acquisition. It is to be appreciated that in addition to a stand-alone local or web-based application, the contextual vocabulary interface application 102 can be utilized on different types of platforms, computing infrastructure, and/or devices that are in production and that are not yet in production. For example, the contextual vocabulary interface application 102 can be executed on a social media platform to be utilized as a social media specific application or plug-in.

The embodiments discussed herein can also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data. Computer readable storage media excludes non-transitory tangible media and propagated data signals.

It will be appreciated that various implementations of the above-disclosed and other features and functions, or alternatives or varieties thereof, can be desirably combined into many other different systems or applications. Also that various presently unforeseen or unanticipated alternatives, modifications, variations or improvements therein can be subsequently made by those skilled in the art which are also intended to be encompassed by the following claims.

What is claimed is:

1. A method for facilitating contextual vocabulary acquisition by a user through association, the method comprising steps:
   (a) compiling a plurality of lists, wherein each of said plurality of lists comprises a plurality of different vocabulary words;
   (b) selecting, for each vocabulary word in each list, an audio segment and a kinesthetic contextual feature for reinforcing a positive association between the vocabulary word and a meaning of the vocabulary word, wherein none of the audio segments and kinesthetic contextual features selected for the vocabulary words in the lists are the same, wherein the audio segment and the kinesthetic contextual feature relate to the meaning of the vocabulary word;
   (c) separately displaying each vocabulary word in one of the lists and the meaning of said displayed vocabulary word to the user on a graphical user interface of an electronic device while the electronic device synchronously or immediately successively plays the audio segment and prompts the user to physically interact with the electronic device to perform the kinesthetic feature selected for the displayed vocabulary word; wherein the electronic device provides an option for the user to select:
   i) an image relating to the meaning of the displayed vocabulary word,
   ii) a video segment relating to the meaning of the displayed vocabulary word,
   iii) an audible pronunciation of the displayed vocabulary word, iv) a synonym, homonym, or homophone of the displayed vocabulary word, and
v) a sentence including the displayed vocabulary word, wherein a selection made by the user is output by the electronic device;
(d) presenting a plurality of practice vocabulary assessment inquiries to the user on the graphical user interface that test whether the user knows the meaning of the vocabulary words separately displayed in step (c), wherein said practice vocabulary assessment inquiries correlate to the audio segments and kinesthetic feature for reinforcing the positive association between the vocabulary words and the meaning of the vocabulary words in the list;
(e) requiring the user to input into the electronic device a plurality of correct user responses to the practice vocabulary assessment inquiries presented in step (d) that meet a minimum practice assessment threshold value as a precondition to allowing the user to select a master vocabulary assessment tool displayed to the user on the graphical user interface;
(f) in response to an allowed selection of the master vocabulary assessment tool by the user, presenting a plurality of master vocabulary assessment inquiries to the user on the graphical user interface that test whether the user knows the meaning of the vocabulary words separately displayed in step (c), wherein said master vocabulary assessment inquiries do not correlate to the audio segments and kinesthetic features for reinforcing the positive association between the vocabulary words and the meaning of the vocabulary words in the list; and
(g) requiring the user to input into the electronic device a plurality of correct user responses to the master vocabulary assessment inquiries that meet a minimum advancement threshold value as a precondition to allowing the user to repeat steps (c), (d), (e), (f) and (g) for a different one of the lists, wherein the method facilitates contextual vocabulary acquisition by the user through association.

2. The method according to claim 1, wherein a selectable icon is displayed on the graphical user interface with the displayed vocabulary word and, in response to selection of the icon, the audible pronunciation of the displayed vocabulary word is played to the user using the electronic device.

3. The method according to claim 2, wherein the audible pronunciation of the displayed vocabulary word is played to the user using headphones associated with the electronic device.

4. The method according to claim 1, wherein the audio segment includes the audible pronunciation of the displayed vocabulary word.

5. The method according to claim 1, further comprising displaying the video segment to the user using the graphical user interface, said video segment including still or moving images for reinforcing the positive association between the displayed vocabulary word and the meaning of the displayed vocabulary word.

6. The method according to claim 1, wherein at least one of the lists of vocabulary words includes a plurality of vocabulary words that have been used in one or more past standardized tests.

7. The method according to claim 6, wherein the one or more past standardized tests are postsecondary standardized tests.

8. The method according to claim 1, wherein the electronic device is a portable electric device selected from the group consisting of a smart phone, a laptop, a tablet, and an e-reader.

9. The method according to claim 1, wherein the electronic device is a stationary computing device.

10. The method according to claim 9, wherein the stationary computing device is a desktop computer.

11. The method according to claim 1, wherein the displayed vocabulary word is displayed in a font that is related to the meaning of the vocabulary word.

12. The method according to claim 1, wherein the displayed vocabulary word is displayed in a color that is related to the meaning of the displayed vocabulary word.

13. The method according to claim 1, wherein:
synonyms of the displayed vocabulary word are displayed;
the synonyms are displayed in a list of increasing level of difficulty; and
the synonyms within the list are displayed in an increasing color intensity or an increasing gradient of black.

14. The method according to claim 1, wherein:
the displayed vocabulary word is displayed in word combinations including the displayed vocabulary word in collocation with other words; and
the word combinations are related to the meaning of the displayed vocabulary word.

* * * * *

UNITED STATES PATENT AND TRADEMARK OFFICE
CERTIFICATE OF CORRECTION

PATENT NO.         : 10,373,516 B2
APPLICATION NO.    : 15/888063
DATED              : August 6, 2019
INVENTOR(S)        : Paulette S. Goll et al.

Page 1 of 1

It is certified that error appears in the above-identified patent and that said Letters Patent is hereby corrected as shown below:

In the Specification

In Column 7, Line 11, delete "FLOURSIH-- GROW, thrive"
insert --"FLOURISH--GROW, thrive"--

Signed and Sealed this
Twenty-ninth Day of October, 2019

Andrei Iancu
*Director of the United States Patent and Trademark Office*